United States Patent
Chidambarrao et al.

(10) Patent No.: US 10,628,544 B2
(45) Date of Patent: *Apr. 21, 2020

(54) OPTIMIZING INTEGRATED CIRCUIT DESIGNS BASED ON INTERACTIONS BETWEEN MULTIPLE INTEGRATION DESIGN RULES

(71) Applicant: International Business Machines Corporation, Armonk, NY (US)

(72) Inventors: Dureseti Chidambarrao, Weston, CT (US); Jason D. Hibbeler, Hinesburg, VT (US); Dongbing Shao, Wappingers Falls, NY (US); Steven Zebertavage, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 15/714,086

(22) Filed: Sep. 25, 2017

(65) Prior Publication Data

US 2019/0095550 A1   Mar. 28, 2019

(51) Int. Cl.
    *G06F 17/50* (2006.01)
    *H01L 27/02* (2006.01)

(52) U.S. Cl.
    CPC ........ *G06F 17/505* (2013.01); *G06F 17/5022* (2013.01); *G06F 17/5068* (2013.01);
    (Continued)

(58) Field of Classification Search
    CPC ............... G06F 17/505; G06F 17/5068; G06F 17/5022; G06F 2217/12; G06F 17/5081; G06F 2217/10; H01L 27/0207
    See application file for complete search history.

(56) References Cited

U.S. PATENT DOCUMENTS 5,984,510 A * 11/1999 Guruswamy ....... G06F 17/5068
                                                          716/104
6,189,132 B1 * 2/2001 Heng ................. G06F 17/5081
                                                          716/122

(Continued)

OTHER PUBLICATIONS

Chidambarrao et al., "Optimizing Integrated Circuit Designs Based on Interactions Between Multiple Integration Design Rules", U.S. Appl. No. 15/816,210, filed Nov. 17, 2017, 35 pages.

(Continued)

*Primary Examiner* — Helen Rossoshek
(74) *Attorney, Agent, or Firm* — Michael A. Petrocelli (57) ABSTRACT

A technique for optimizing integrated circuit (IC) designs based on interaction between multiple integration design rules is provided. For a plurality of IC features, total risk values are determined based on multiple integration design rules. IC features are ordered based on the total risk values. IC features having the highest total risk values are selected based on a threshold count. An IC design is clipped around the high-risk IC features. An overall failure rate is simulated for the clipped area. If the overall failure rate exceeds a threshold, a predicted failure rate for each design rule that applies to IC features within the clipped area is calculated. A high-risk design rule is identified based on the predicted failure rates. The IC design is modified such that a difference between a design rule value of the high-risk design rule and a corresponding design value is reduced.

13 Claims, 5 Drawing Sheets

(52) U.S. Cl.
CPC ...... *G06F 17/5081* (2013.01); *G06F 2217/10* (2013.01); *G06F 2217/12* (2013.01); *H01L 27/0207* (2013.01)

(56) References Cited

U.S. PATENT DOCUMENTS

| | | | | |
|---|---|---|---|---|
| 6,480,137 B2* | 11/2002 | Kulkarni | ............ | G06F 17/5068 257/E27.048 |
| 6,735,749 B2* | 5/2004 | Li | ............ | G06F 17/5081 703/1 |
| 6,973,637 B2* | 12/2005 | Sharpe | ............ | G06F 17/5068 430/311 |
| 7,155,689 B2 | 12/2006 | Pierrat | | |
| 7,284,231 B2* | 10/2007 | Lucas | ............ | G06F 17/5068 716/51 |
| 7,506,277 B1 | 3/2009 | Arora et al. | | |
| 7,681,170 B2* | 3/2010 | Liao | ............ | G06F 17/5068 716/50 |
| 7,689,948 B1 | 3/2010 | White et al. | | |
| 7,689,951 B2 | 3/2010 | Cazeaux | | |
| 7,707,528 B1 | 4/2010 | White et al. | | |
| 7,724,028 B1* | 5/2010 | Ansari | ............ | H03K 19/17732 326/38 |
| 7,735,053 B2* | 6/2010 | Harazaki | ............ | G03F 1/36 716/53 |
| 7,802,210 B2* | 9/2010 | Bae | ............ | G06F 17/5068 716/52 |
| 7,818,694 B2 | 10/2010 | Allen et al. | | |
| 7,873,929 B2* | 1/2011 | Kahng | ............ | G06F 17/5072 716/118 |
| RE42,294 E * | 4/2011 | Kotani | ............ | G06F 17/5081 716/106 |
| 7,962,886 B1* | 6/2011 | Pandey | ............ | G06F 17/5045 716/136 |
| 7,987,442 B2* | 7/2011 | Rajski | ............ | G01R 31/01 714/737 |
| 8,001,512 B1* | 8/2011 | White | ............ | G06F 17/5068 703/14 |
| 8,095,894 B2 | 1/2012 | Misaka et al. | | |
| 8,103,982 B2 | 1/2012 | Scheffer | | |
| 8,173,491 B2* | 5/2012 | Law | ............ | H01L 27/0207 438/128 |
| 8,453,103 B2* | 5/2013 | Bendicksen | ............ | G06F 17/5081 716/139 |
| 8,464,189 B2* | 6/2013 | Allen | ............ | G06F 17/5077 716/106 |
| 8,473,874 B1* | 6/2013 | Sharma | ............ | G06F 17/5081 700/120 |
| 8,490,038 B1 | 7/2013 | Arora | | |
| 8,510,699 B1* | 8/2013 | Acar | ............ | G06F 17/5068 716/110 |
| 8,516,402 B1* | 8/2013 | Wang | ............ | G03F 1/70 716/52 |
| 8,612,919 B2* | 12/2013 | Pikus | ............ | G06F 17/5081 716/102 |
| 8,656,323 B2 | 2/2014 | Park | | |
| 8,683,392 B2* | 3/2014 | Hsieh | ............ | G03F 1/70 716/51 |
| 8,707,223 B2* | 4/2014 | Blatchford | ............ | G06F 17/5077 716/55 |
| 8,735,050 B2* | 5/2014 | Yuan | ............ | G06F 17/5068 430/311 |
| 8,751,974 B2* | 6/2014 | Kahng | ............ | G03F 1/70 716/110 |
| 8,799,830 B2 | 8/2014 | Robles | | |
| 8,898,617 B2* | 11/2014 | White | ............ | G06F 17/5068 716/136 |
| 8,966,424 B2* | 2/2015 | Quandt | ............ | G06F 17/5068 716/119 |
| 9,122,832 B2* | 9/2015 | Reed | ............ | G06F 17/5081 |
| 9,489,479 B2 | 11/2016 | Liu | | |
| 9,627,370 B1* | 4/2017 | Lam | ............ | G06F 17/5081 |
| 10,083,272 B2* | 9/2018 | Clevenger | ............ | G06F 17/5081 |
| 10,096,530 B1* | 10/2018 | Lam | ............ | H01L 22/26 |
| 10,228,320 B1* | 3/2019 | Levinski | ............ | G01N 21/01 |
| 2005/0251771 A1 | 11/2005 | Robles | | |
| 2007/0011637 A1* | 1/2007 | Seidl | ............ | G06F 17/5081 716/119 |
| 2007/0022400 A1* | 1/2007 | Kadota | ............ | G06F 17/5068 716/112 |
| 2007/0118824 A1* | 5/2007 | Bae | ............ | G06F 17/504 716/52 |
| 2009/0055789 A1* | 2/2009 | McIlrath | ............ | G06F 17/5045 716/122 |
| 2010/0109005 A1* | 5/2010 | Grillberger | ............ | H01L 22/34 257/48 |
| 2014/0045334 A1* | 2/2014 | Choi | ............ | H01L 21/308 438/694 |
| 2015/0302129 A1* | 10/2015 | Chen | ............ | G06F 17/5072 716/55 |
| 2015/0356232 A1* | 12/2015 | Bomholt | ............ | G06F 17/5081 716/52 |
| 2016/0035615 A1* | 2/2016 | Chang | ............ | H01L 21/7682 438/778 |
| 2017/0039308 A1 | 2/2017 | Moroz | | |
| 2017/0228491 A1* | 8/2017 | Culp | ............ | G06F 17/5081 |
| 2018/0107781 A1 | 4/2018 | Berkens | | |
| 2018/0157784 A1* | 6/2018 | Levinski | ............ | G03F 7/705 |
| 2018/0211947 A1* | 7/2018 | Chu | ............ | H01L 27/0207 |
| 2018/0211948 A1* | 7/2018 | Chu | ............ | H01L 27/0207 |
| 2018/0232478 A1* | 8/2018 | Golovanevsky | ............ | G03F 7/70633 |
| 2019/0072845 A1* | 3/2019 | Lin | ............ | G06F 17/5009 |
| 2019/0072846 A1* | 3/2019 | Lin | ............ | G06F 17/5009 |
| 2019/0095551 A1 | 3/2019 | Chidambarrao | | |
| 2019/0311071 A1 | 10/2019 | Liu | | |

OTHER PUBLICATIONS

Appendix P, List of IBM Patents or Patent Applications Treated as Related, 2 pages, dated Nov. 29, 2017.

Clevenger et al., "Integrated Circuit Design Layout Optimizer Based on Process Variation and Failure Mechanism", U.S. Appl. No. 15/235,273, filed Aug. 12, 2016, 35 pages.

Mukherjee et al., "Leveraging pre-silicon data to diagnose out-of-specification failures in mixed-signal circuits", DAC '14, Jun. 1-5, 2014, San Francisco, CA, USA, Copyright 2014 ACM, 6 pages.

\* cited by examiner

| Rule | DesignValue | RuleValue | RuleSlack | RuleRisk |
|---|---|---|---|---|
| A/B | 8 nm | 8 nm | 0 nm | 6 |
| A/C | 10 nm | 6 nm | 4 nm | 2 |
| A/D | 11 nm | 7 nm | 4 nm | 2 |
| MaxRisk = 6 nm | | | RuleRiskSum(A) = 10 | |

OPTIMIZING INTEGRATED CIRCUIT DESIGNS BASED ON INTERACTIONS BETWEEN MULTIPLE INTEGRATION DESIGN RULES

TECHNICAL FIELD

The present invention relates generally to the field of integrated circuit design and, more particularly, to optimizing integrated circuit designs based on interactions between multiple integration design rules.

BACKGROUND

Design for manufacturing (DFM) refers to various "design rules" that are implemented during the design of integrated circuits (IC(s)) to improve the manufacturability of the ICs. More specifically, design rules are rules that are intended to ensure that ICs can be manufactured with economical yields and ensure that ICs possess sufficient reliability in operation. Design rules are often set by semiconductor manufacturers (i.e., "foundries") based on manufacturing process constraints. In particular, the trend towards smaller and smaller nodes has challenged foundries to overcome the limitations of various photolithographic, chemical, and mechanical processes with respect to the accuracy and the precision of feature dimensions and positioning. For example, diffraction effects and variations in mask placement, depth of focus, and light intensity can affect the accuracy and precision with which shapes (i.e., IC components) can be patterned on wafers. IC designs that do not account for such effects can result in higher rates of manufacturing defects occurring due, for example, to pinched, broken, or shorted components. To improve yields and reliability, foundries often specify design rules that control various dimensional parameters of IC designs by mandating, among other things, minimum space checks, minimum width checks, minimum area overlap checks, and minimum area variability checks on IC designs prior to accepting an IC design for fabrication. As process nodes have become smaller and smaller, foundries have generally implemented design rules of increasing complexity.

SUMMARY

According to one embodiment of the present invention, a method for optimizing integrated circuit (IC) designs based on interactions between multiple integration design rules is provided. The method includes: identifying, within an IC design, a plurality of IC features having design shapes; for each IC feature, determining a total risk value based, at least in part, on one or more integration design rules; ordering, based on the total risk value of each IC feature, the IC features from an IC feature having a highest total risk value to an IC feature having a lowest total risk value; identifying, beginning with the IC feature having the highest total risk value, a threshold count of IC features from the ordered IC features, wherein IC features within the threshold count of IC features represent a plurality of high-risk IC features; clipping the IC design around the high-risk features to produce a clipped area; simulating an overall failure rate of IC features within the clipped area; determining that the overall failure rate exceeds a threshold overall failure rate, and in response, calculating a predicted failure rate for each design rule that applies to IC features within the clipped area; identifying a high-risk design rule for which the predicted failure rate exceeds a threshold failure rate of the clipped area, wherein the high-risk design rule specifies a respective design rule value; and modifying the IC design such that a difference between the design rule value of the high-risk design rule and a corresponding design value of the IC design is reduced.

According to another embodiment of the present invention, a computer program product for optimizing integrated circuit (IC) designs based on interactions between multiple integration design rules is provided is provided. The computer program product comprises a computer readable storage medium and program instructions stored on the computer readable storage medium. The program instructions include: program instructions to identify, within an IC design, a plurality of IC features having design shapes; program instructions to, for each IC feature, determine a total risk value based, at least in part, on one or more integration design rules; program instructions to order, based on the total risk value of each IC feature, the IC features from an IC feature having a highest total risk value to an IC feature having a lowest total risk value; program instructions to identify, beginning with the IC feature having the highest total risk value, a threshold count of IC features from the ordered IC features, wherein IC features within the threshold count of IC features represent a plurality of high-risk IC features; program instruction to clip the IC design around the high-risk features to produce a clipped area; program instructions to simulate an overall failure rate of IC features within the clipped area; program instructions to calculate a predicted failure rate for each design rule that applies to IC features within the clipped area in response to determining that the overall failure rate exceeds a threshold overall failure rate; program instructions to identify a high-risk design rule for which the predicted failure rate exceeds a threshold failure rate of the clipped area, wherein the high-risk design rule specifies a respective design rule value; and program instructions to modify the IC design such that a difference between the design rule value of the high-risk design rule and a corresponding design value of the IC design is reduced.

According to another embodiment of the present invention, a computer system for optimizing integrated circuit (IC) designs based on interactions between multiple integration design rules is provided is provided. The computer system includes one or more computer processors, one or more computer readable storage media, and program instructions stored on the computer readable storage media for execution by at least one of the one or more processors. The program instructions include: program instructions to identify, within an IC design, a plurality of IC features having design shapes; program instructions to, for each IC feature, determine a total risk value based, at least in part, on one or more integration design rules; program instructions to order, based on the total risk value of each IC feature, the IC features from an IC feature having a highest total risk value to an IC feature having a lowest total risk value; program instructions to identify, beginning with the IC feature having the highest total risk value, a threshold count of IC features from the ordered IC features, wherein IC features within the threshold count of IC features represent a plurality of high-risk IC features; program instruction to clip the IC design around the high-risk features to produce a clipped area; program instructions to simulate an overall failure rate of IC features within the clipped area; program instructions to calculate a predicted failure rate for each design rule that applies to IC features within the clipped area in response to determining that the overall failure rate exceeds a threshold overall failure rate; program instructions to identify a high-risk design rule for which the predicted failure rate exceeds a threshold failure rate of the clipped area, wherein the high-risk design rule specifies a respective design rule value; and program instructions to modify the IC design such that a difference between the design rule value of the high-risk design rule and a corresponding design value of the IC design is reduced.

DETAILED DESCRIPTION

In general, three types of design rules exist: restrictive design rules (RDR(s)), process design rules, and integration design rules.

Restrictive design rules are design rules that seek to improve the manufacturability of IC designs by standardizing IC features (i.e., IC design shapes). Restrictive design rules standardize IC design by specifying, alone or in any combination, specific feature dimensions, specific pitch lengths (i.e., the distance between identical features), and specific feature orientations.

Process design rules are design rules that specify minimum feature dimensions (e.g., lengths, widths, and thicknesses) to improve yields by minimizing the occurrence of defects (e.g., pinched, broken, or shorted interconnects) due to variations in the manufacturing process. Variations in the manufacturing process can result in feature dimensions that depart from the dimensions specified by the IC design and/or design rules. Process design rules are chosen such that variations in the manufacturing process do not result in features having dimensions less than the dimensions that are likely to increase the rate of manufacturing defects and thus reduce yields.

Integration design rules are design rules involving dimensional parameters with respect to two or more design layers. Integration design rules can represent design considerations with respect to restrictive design rules, process design rules, or a combination of restrictive design rules and process design rules between multiple layers. The concept of "layers" results from the series of photolithographic masks that are typically used to pattern features onto an IC wafer. An interlayer integration design rule can, for example, specify a minimum "overlap" (e.g., in terms of area) between features in adjacent layers (i.e., sequential masks; e.g., the overlap of a contact and a transistor gate) or specify a minimum separation between features patterned in different layers (e.g., transistors and adjacent vias). In general, integration design rules are calculated based on wafer failure mechanism and manufacturing process information such as critical dimension uniformity, positioning errors with respect to scanners and/or steppers (i.e., "overlay" errors), and expected differences between IC design dimensions and "on-wafer" dimensions (i.e., "bias"), among other things.

Embodiments of the present invention recognize that "rule slack," or "RuleSlack," generally decreases as IC node sizes decrease because variations in the IC fabrication process become larger as a percentage of IC design and "on-wafer" dimensions (e.g., feature dimensions and spacing between features). Similarly, multiple patterning (e.g., double, triple, and quadruple patterning) increases the probability of overlay errors (i.e., positioning errors with respect to scanners and/or steppers) and increases the complexity of integration design rules. Furthermore, embodiments of the present invention recognize that, while designing an IC feature with minimum rule slack (i.e., at a minimum design rule) may not disadvantageously effect yields and reliability based on an analysis of the individual design rule, (i) interactions between design rules are complex and (ii) designing IC features at multiple minimum design rules and/or a minimum integration design rule can produce effects that combine to unacceptably increase the risk of failures and correspondingly decrease yields and reliability. For example, increasing an IC dimensions to improve an IC design with respect to a first design rules may increase the likelihood of failures with respect to a second design rule. Additionally, embodiments of the present invention recognize that, even in situations where an IC design does not violate any individual integration design rule, interactions between integration design rules (i.e., multi-rule interactions) can increase risk.

As used herein, "rule slack" refers to a measure of advantageous "redundancy" that a specific design dimensions can be reduced before violating an applicable design rule. Additionally, "actual rule slack" refers to the "redundancy" that a specific design dimension can be reduced before resulting in lower yields or lower reliability due to on-wafer failures. Persons having ordinary skill in the art will understand that "actual rule slack" is not known during the design and design verification phase of IC production.

Embodiments of the present invention provide a technique for analyzing interactions between multiple integration design rules in order to identify high-risk IC regions and optimize IC designs by selectively increasingly rule slack with respect to individual integration design rules within the high-risk IC regions.

Figure 1:
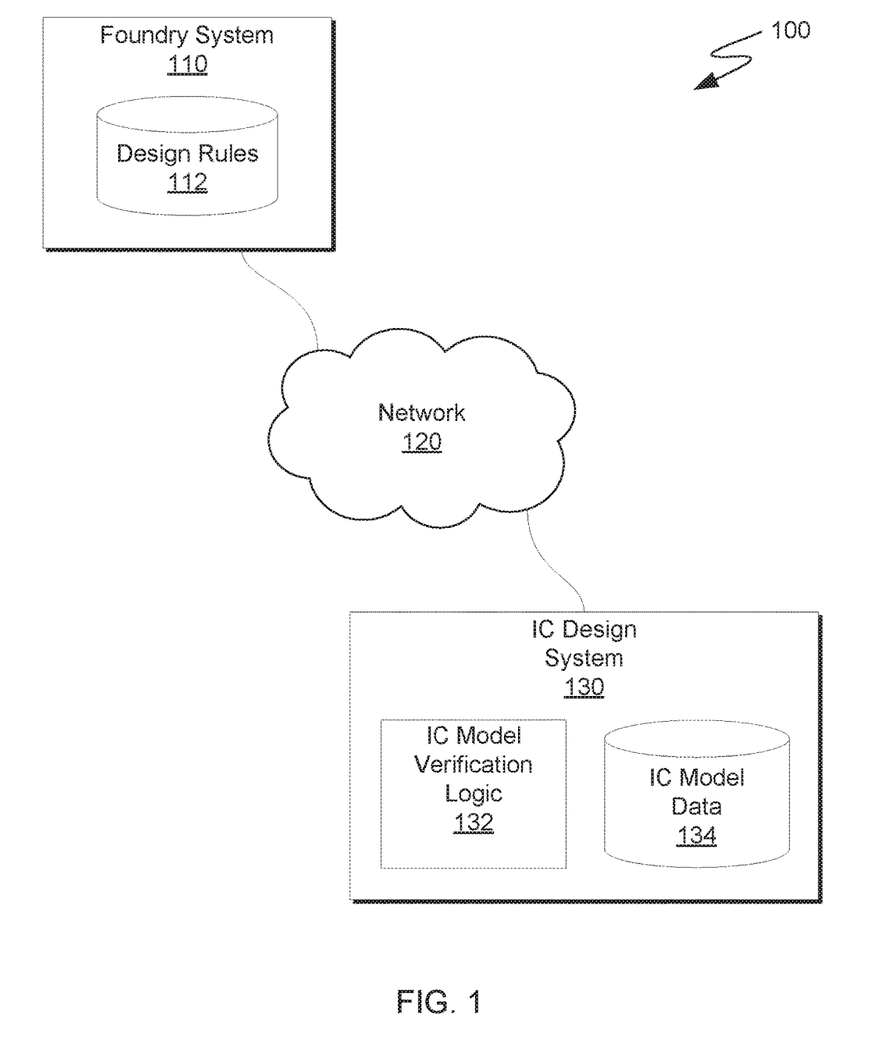
FIG. 1 is a functional block diagram illustrating a computing environment, in accordance with an embodiment of the present invention.

Embodiments of the present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes foundry system 110 and IC design system 130, which are communicatively connected over network 120. Foundry system 110 includes design rules 112; IC design system 130 includes IC model verification logic 132 and IC model data 134.

In various embodiments, foundry system 110 is a computing device that can be a standalone device, a server, a laptop computer, a tablet computer, a netbook computer, a personal computer (PC), or a desktop computer. In another embodiment, foundry system 110 represents a computing system utilizing clustered computers and components to act as a single pool of seamless resources. In general, foundry system 110 can be any computing device or a combination of devices with access to IC design system 130 and the capability to store or access design rules 112. Foundry system 110 may include internal and external hardware components, as depicted and described in further detail with respect to FIG. 5. In general, foundry system 110 represents the information technology infrastructure of an IC foundry. As previously described herein, IC foundries generally require that IC designs adhere to any one or any combination of restrictive design rule(s), process design rule(s), and/or integration design rule(s) prior to accepting an IC design for fabrication. In other embodiments, foundry system 110 stores one or more design rules but communicates the one or more design rules to IC design system 130 via a method other than network 120 (e.g., physically sending a computer readable storage device to IC design system 130 on which design rules 112 are stored). In general, foundry system 110 can utilize any one method of communication or any combination of methods of communication explicitly and/or implicitly described herein to communicate design rules 112 to IC design system 130.

Design rules 112 represents a data repository that may be written to and read by one or both of foundry system 110 and IC design system 130. Design rules 112 can store one or more design rules. For example, design rules 112 can store one or more restrictive design rules, one or more process design rules, one or more integration design rules, and any combination of the aforementioned types of IC design rules. In general, foundry system 110 can include any number of data repositories to store any information with respect to the fabrication of ICs. In some embodiments, design rules 112 may be written to and read by programs and entities outside of computing environment 100 in order to populate the repository, or any repository that is associated with foundry system 110, with information relating to the fabrication of ICs.

In the embodiment depicted in FIG. 1, Network 120 communicatively connects foundry system 110 and IC design system 130 to facilitate the transfer of information between the two systems. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between foundry system 110 and IC design system 130, in accordance with various embodiments of the present invention.

In various embodiments, IC design system 130 is a computing device that can be a standalone device, a server, a laptop computer, a tablet computer, a netbook computer, a personal computer (PC), or a desktop computer. In other embodiments, IC design system 130 represents a computing system utilizing clustered computers and components to act as a single pool of seamless resources. In general, IC design system can be any computing device or a combination of devices with access to that is capable of executing IC model verification logic 132 and with access to IC model data 134. IC designs system 130 can include internal and external hardware components, as depicted and described in further detail with respect to FIG. 5.

In the embodiment depicted in FIG. 1, IC model verification logic 132 and IC model data 134 are stored on IC design system 130. IC model data 134 represents a data repository that may be written to and read by computer programs executing on one or both of foundry system 110 and IC design system 130 (e.g., IC model verification logic 132). In other embodiments, one or both of IC model verification logic 132 and IC model data 134 can reside on another computing device, provided that each can access and is accessible by each other. In yet other embodiments, one or both of IC model verification logic 132 and IC model data 134 can be stored externally and accessed through a communication network, such as network 120. Additionally, IC model data 134 can be written to and read by programs and entities outside of computing environment 100 in order to populate the repository, or any repository associated with IC design system 130, with data representing one or more IC designs, one or more IC design rules, and any other information relating to IC fabrication and design.

In general, IC model verification logic 132 operates to, among other things, evaluate various integration design rules to identify high-risk IC regions and optimize IC designs by selectively increasingly rule slack with respect to individual integration design rules within the high-risk IC regions, as will be described in greater detail with respect to subsequent figures.

Figure 2:
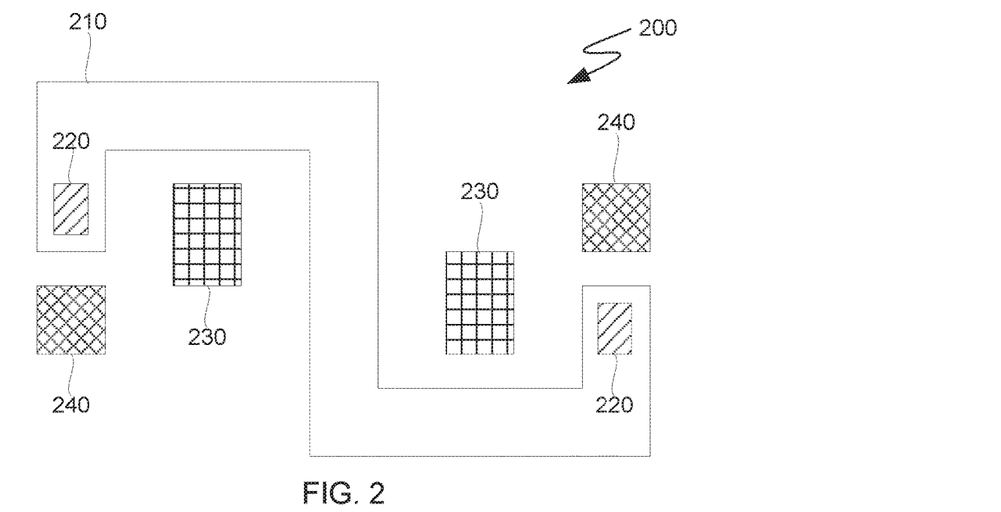
FIG. 2 is an abstract representation of IC features to which various integration design rules apply, in accordance with an embodiment of the present invention.

FIG. 2 is an abstract representation of IC features to which various integration design rules apply, in accordance with an embodiment of the present invention. More specifically, FIG. 2 depicts representative IC region 200. Persons having ordinary skill in the art will understand that representative IC region 200 is a simplified depiction of various IC features to facilitate discussion of various aspects of embodiments of the present invention. For example, representative IC region 200 includes interconnect 210, vias 220, caches 230, and transistor contacts 240. Persons of ordinary skill in the art will understand that one more IC design rules can apply to each of the features depicted in representative IC region 200 such that the IC design rules determine, to a certain extent, the shapes and/or dimensions of corresponding IC features. For example, RDRs may apply to the dimensions of caches 230 and transistor contacts 240. Similarly, a process design rule may apply to a minimum thickness of interconnect 210. Persons of ordinary skill in the art will also understand that representative IC region 200 depicts multiple "layers" and/or "patterns" on an IC and that, in general, each type of feature depicted in representative IC region 200 is patterned (i.e., shaped) and deposited utilizing respective mask(s) and various other fabrication processes (e.g., depositing photoresists, etching, and various forms of planarization). Accordingly, representative IC region 200 depicts a region of an IC in which multiple integration design rules apply. For example, a first integration design rule may dictate a minimum "enclosure" with respect to vias 220 and interconnect 210 (i.e., a minimum dimensional margin between the edges of vias 220 and the edges of interconnect 210). Similarly, a second integration design rule may dictate a minimum "spacing" between caches 230 and interconnect 210 and a third design rule may dictate a minimum "spacing" between transistor contacts 240 and interconnect 210. FIG. 2 does not depict an exhaustive list of design rules to which embodiments of the present invention apply. Persons having ordinary skill in the art will readily understand that, as described herein, IC model verification logic 132 can also analyze various other types of IC design rules (e.g., integration design rules applicable to source, drain, and gate regions of transistors and source, drain, and gate contacts, among others).

Figure 3A:
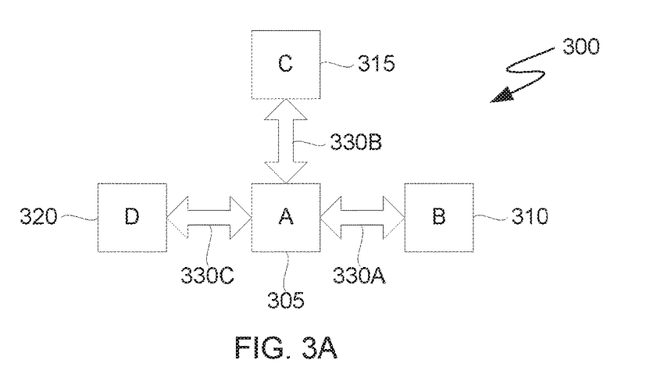
FIG. 3A is an abstract representation of IC features to which various integration design rules apply, in accordance with an embodiment of the present invention.
Figure 3B:
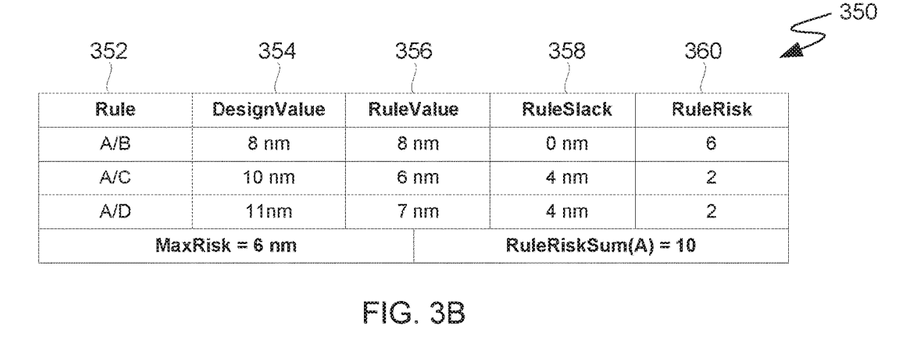
FIG. 3B is a table depicting values used to characterize risk with respect to one of the IC features depicted in FIG. 3A, in accordance with an embodiment of the present invention.

FIG. 3A is an abstract representation of IC features to which various integration design rules apply, in accordance with an embodiment of the present invention. More specifically, FIG. 3A depicts representative IC region 300, which is a yet more simplified depiction of various IC features than a representative IC region 200 depicted in FIG. 2. Representative IC region 300 is a simplified depiction of various IC features to facilitate discussion of various aspects of embodiments of the present invention. Representative IC region 300 includes IC feature 305 (i.e., the feature identified as "A"), IC feature 310 (i.e., the feature identified as "B"), IC feature 315 (i.e., the feature identified as "C"), and IC feature 320 (i.e., the feature identified as "D"). In the embodiment depicted in FIG. 3A, three integration design rules apply to IC features 305, 310, 315, and 320. A first integration design rule, integration design rule 330A, represents a distance between IC feature 305 and IC feature 310. A second integration design rule, integration design rule 330B, represents a distance between IC feature 305 and IC feature 315. A third integration design rule, integration design rule 330C, represent a distance between IC feature 305 and IC feature 320. Integration design rules 330A, 330B, and 330C are collectively referred to as integration design rules 330 herein. Integration design rules 330 represent integration design rules with respect to IC feature 305. Persons having ordinary skill in the art will understand that additional integration design rules that are not depicted in FIG. 3A, as well as other IC design rules, may apply to representative IC region 300 (e.g., an integration design rule representing a distance between IC feature 310 and IC feature 315 and an integration design rule representing a distance between IC feature 320 and IC feature 315). FIG. 3 does not depict an exhaustive list of design rules to which embodiments of the present invention apply and is merely intended to provide a point of reference to facilitate a discussion of the calculation of the "RuleRiskSum" for IC feature 305, as discussed subsequently with respect to FIG. 3B.

FIG. 3B is a table depicting values used to characterize risk with respect to one of the IC features depicted in FIG. 3A, in accordance with an embodiment of the present invention. More specifically, FIG. 3A depicts values that characterize integration design rules 330 and from which IC model verification logic 132 can calculate a "RuleSlack" and a "RuleRisk" for each integration design rule and a "RuleRiskSum" with respect to IC feature 305, as described herein. For example, table 350 includes: a column (i.e., column 352) listing each integration design rule that applies to IC feature 305 (i.e., feature "A"; integration design rule 330A, "rule A/B," integration design rule 330B, "rule A/C," and integration design rule 330C, "rule A/D"); a column listing a design value for each integration design rule (i.e., "DesignValue," column 354); a column listing a minimum rule value for each integration design rule (i.e., "RuleValue," column 356); a column listing a "rule slack" for each integration design rule (i.e., "RuleSlack," column 358); and a column listing a "rule risk" for each integration design rule (i.e., "RuleRisk," column 360). Table 350 also includes a "max risk" (i.e., "MaxRisk") value and a "rule-risk sum" value (i.e., "RuleRiskSum") for the IC feature being analyzed (i.e., IC feature 305 in the embodiment depicted in FIG. 3B).

In general, integration design rule values (i.e., values in column 356) and the value for "MaxRisk" are determined based on explicit or implicit requirements of one or more foundries in which fabrication is desired (e.g., the "RuleValues" and "MaxRisk" value may be based on information from design rules 112 on foundry system 110). Persons having ordinary skill in the art will understand that integration design rule values, as well as other design rule values, and the "MaxRisk" value can vary based on an intended design node, specific fabrication processes used by a foundry, desired yield, desired reliability, failure mode analyses, and/or various other factors and combinations of factors known to such persons. In general, "MaxRisk" is an artificial value that is set with the objective of capping the risk associated with the application of one or more design rules to an IC design. In some embodiments, a selected "MaxRisk" value is based, at least in part, on anticipated deviations from design values due to various factors in IC production (e.g., overlay values, bias values, etc.). For example, in such embodiments, a "MaxRisk" value may be set such that the "MaxRisk" value represents a dimensional value at three or four standard deviations (i.e., $3\sigma$ or $4\sigma$) from one or more design values. In the embodiment depicted in FIG. 3B, which is a simplified depiction of IC features and integration design rules to facilitate discussion, the "MaxRisk" value is 6 nanometers (nm).

Embodiments of the present invention utilize expression 1 to calculate "design rule slack" (i.e., "RuleSlack," the values listed in column 358 of table 350). As used herein, design rule slack represents a margin between a design rule value and the corresponding value specified by an IC design. While introducing the concept of design rule slack to IC design analysis and verification is advantageous for characterizing the anticipated properties of an IC design, design rule slack generally differs from actual rule slack for two reasons. A first reason is that, in general, a design rule value is set to cover a range of design scenarios in which the design rule value is selected based on a worst-case design scenario. Consequently, actual rule slack (i.e., some "redundancy") can exist, even when a design value is set at the minimum design rule value, with respect to a non-worst-case design scenario. A second reason that design rule slack can differ from actual rule slack is that errors due to variations in the fabrication process (e.g., critical dimension uniformity, overlay, and bias) are unknown during the design, analysis, and verification phases of the IC design process. For at least these reasons, actual rule slack is generally unknown during the initial design, analysis, and verifications phases of the IC design process. Design rule slack, or "RuleSlack," is given by:

$$\text{RuleSlack}(x_n) = \text{DesignValue}(x_n) - \text{DesignRule}(x_n), \quad \text{Expression 1}$$

wherein(i) "$x_n$," represents a specific application of an integration design rule with respect to an IC feature for which IC model verification logic 132 is characterizing risk (i.e., calculating a "RuleRiskSum(a)," as subsequently described), (ii) "DesignValue($x_n$)" is a dimensional value specified by an IC design with respect to "$x_n$", and (iii) "DesignRule($x_n$)" is a dimensional value specified by the integration design rule represented by "$x_n$". In table 350, for example, "RuleSlack" for "rule A/B" is calculated by subtracting 8 nm, the "RuleValue" for "rule A/B", from 8 nm, the "DesignValue" for the separation of IC feature 305 and IC feature 310, to yield a "RuleSlack" of 0 nm.

Embodiments of the present invention utilize expression 2 to calculate a "rule risk" (i.e., "RuleRisk," the values listed in column 360 of table 350). As used herein, rule risk characterizes risk with respect to an integration design rule value and a specific value of a dimensional relationship with respect to two of more IC features specified by an IC design. Accordingly, a "RuleRisk" associated with the dimensional value specified by the IC design for a specific application of an integration design rule, "$x_n$", or "RuleRisk($x_n$)" is given by:

$$\text{RuleRisk}(x_n) = \text{MaxRisk} - \text{RuleSlack}(x_n), \quad \text{Expression 2}$$

wherein:

$$\text{RuleRisk}(x_n) = 0 \text{ if MaxRisk} \leq \text{RuleSlack}(x_n), \quad \text{Expression 3}$$

and wherein (i) "MaxRisk" is an artificial value that is set with the objective of capping the risk associated with the application of one or more design rules to an IC design and (ii) "RuleSlack($x_n$)" is the design rule slack with respect to "$x_n$". In table 350, for example, "RuleRisk" for "rule A/B" is calculated by subtracting 0 nm, the "RuleSlack" for "rule A/B", from 6 nm, the "MaxRisk" value, to yield a "RuleRisk" of 6. In the embodiment depicted in FIG. 3B, "RuleRisk" is dimensionless. In other embodiments, "RuleRisk" is given in terms of distance (e.g., nm) or another parameter.

Embodiments of the present invention utilize IC model verification logic 132 and expression 4 to characterize total risk for a specific IC feature (i.e., IC feature "y", RuleRiskSum(y)). Accordingly, the characterized total risk, or RuleRiskSum(y), is given by:

$$\text{RuleRiskSum}(y) = \Sigma_{n=1}^{m} \text{RuleRisk}(x_n) \quad \text{Expression 4}$$

wherein (i) "y" represents an IC feature for which IC model verification logic 132 is characterizing risk (e.g., IC feature 305), (ii) "RuleRisk($x_n$)" represents risk associated with the dimensional value specified by the IC design for a specific application of an integration design rule, "$x_n$" (e.g., "RuleRisk" for "rule A/B" or "RuleRisk" for "rule A/C" or "RuleRisk" for "rule A/D"), and (iii) represents each specific application of an integration design rule to IC feature "y". In FIG. 3B, for example, "RuleRiskSum(A)" is calculated according to expression 5:

$$\text{RuleRiskSum}(A) = \text{RuleRisk}(A/B) + \text{RuleRisk}(A/C) + \text{RuleRisk}(A/D), \quad \text{Expression 5}$$

wherein "A", "B","C", and "D" respectively denote IC features 305, 310, 315, and 320, and wherein "A/B","A/C", and "A/D" each represent a specific applications of a respective integration design rule. In other words, "RuleRiskSum (A)" is obtained by summing the values listed in column 360 with the result that "RuleRiskSum(A)" is equal to 10. In the embodiment depicted in FIG. 3B, "RuleRiskSum(y)" is dimensionless. In other embodiments, "RuleRiskRum(y)" is given in terms of distance (e.g., nm) or another parameter.

Embodiments of the present invention recognize that some design rules are considered more important than others. Foundries, for example, may place greater importance on design rules relating to features and processes that are known to be more susceptible to dimensional variations during fabrication than others. Similarly, foundries may place greater importance on design rules that address certain failure mechanisms over design rules that address other failure mechanisms (e.g., design rules to protect against shorting versus enclosure rules). Additionally, IC designers may identify IC regions and circuitry that have greater importance than other IC regions and circuitry, and thus, IC designers may also specify that certain design rules are more important than others. In circumstances where integration design rules are not of equal importance relative to one another, embodiments of the present invention provide the ability to weight integration design rules relative to one another.

In some embodiments, weighting integration design rules is achieved utilizing a modified version of expression 2, such as expression 7, that is modified to incorporate "$\lambda_n$":

$$\text{RuleRisk}(x_n) = \lambda_n(\text{MaxRisk} - \text{Rule Slack}(x_n)), \quad \text{Expression 7}$$

wherein "$\lambda_n$" is a weighting coefficient based, at least in part, on the type of integration design rule corresponding to "$x_n$," and/or one or more qualities of the IC features to which the design rule is applied (e.g., one or more of the identify of "y", the identity of any other IC feature to which the "DesignValue" applies, and/or a location of the IC features on the IC). In other embodiments, weighting integration design rules is achieved by weighting "RuleRisk($x_n$)" utilizing a modified version of expression 4, such as expression 8, that is modified to incorporate $\lambda_n$:

$$\text{RuleRiskSum}(y) = \Sigma_{n=1}^{m} \lambda_n \text{RuleRisk}(x_n). \quad \text{Expression 8}$$

Figure 4A:
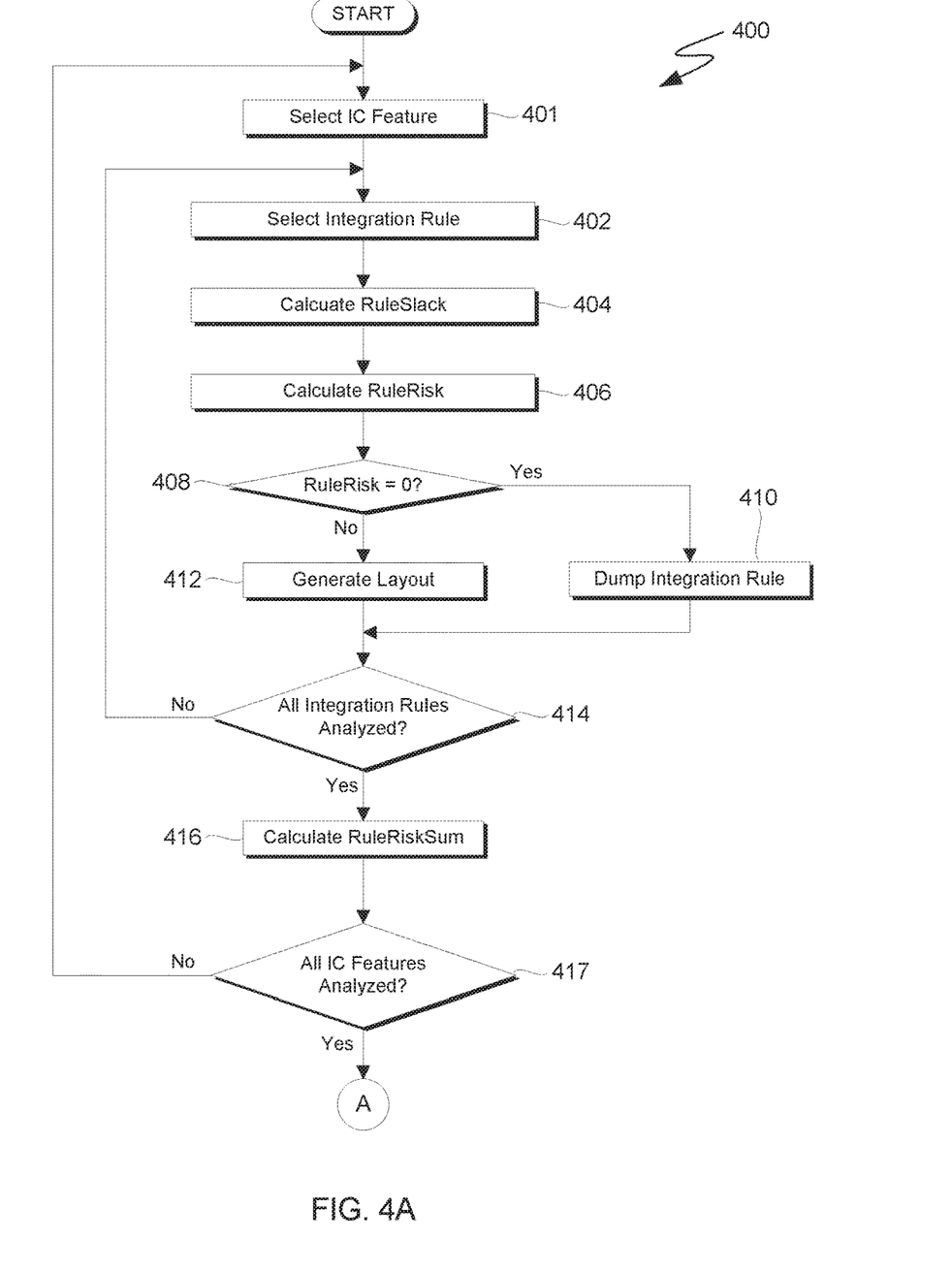
FIG. 4A is a flowchart depicting operations for optimizing IC design by, at least in part, predicting disadvantageous interactions between integration design rules, on a computing device within the computing environment of FIG. 1, in accordance with an embodiment of the present invention.
Figure 4B:
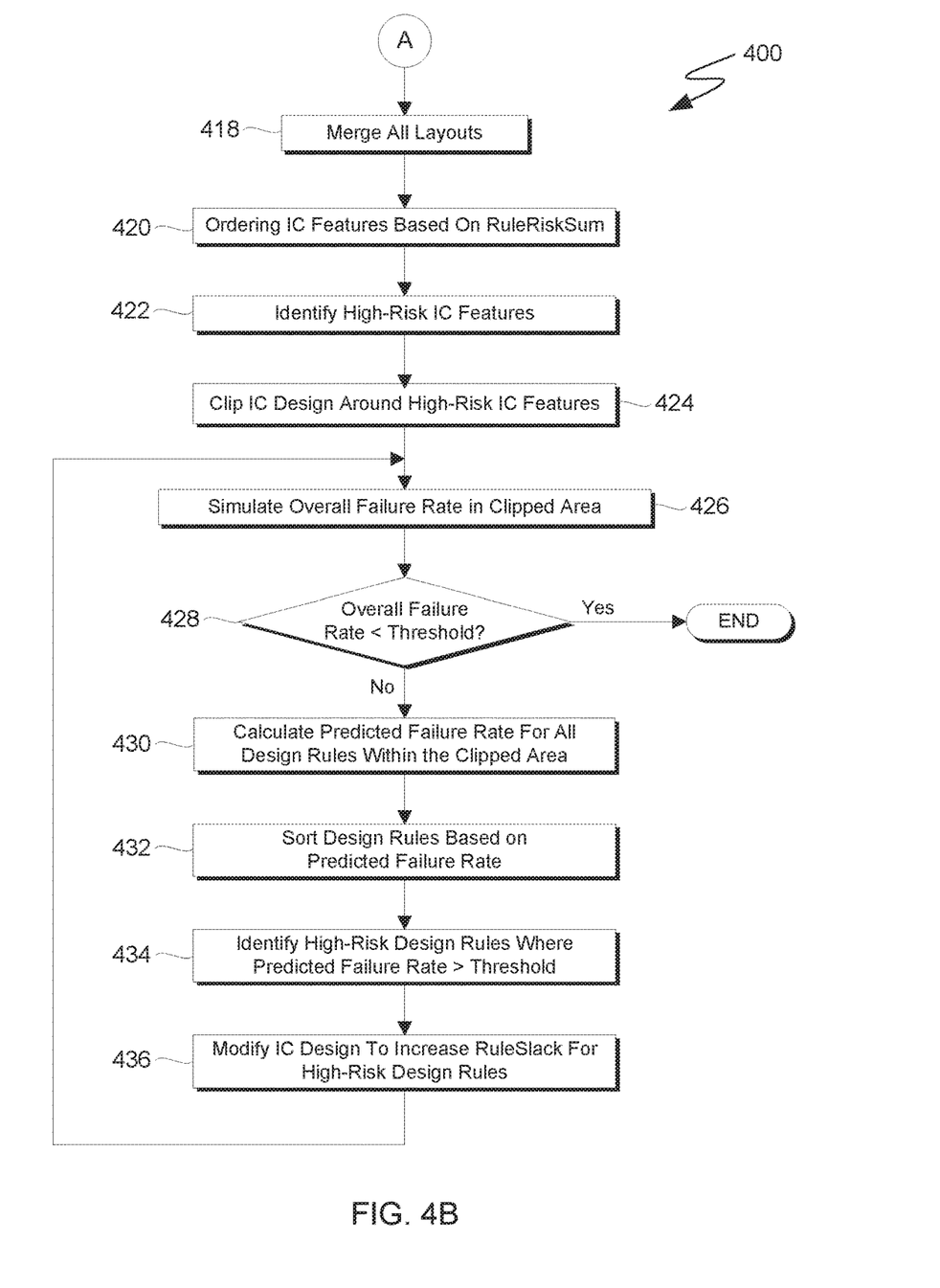
FIG. 4B is a flowchart depicting operations for, in addition to the operations depicted in FIG. 4A, optimizing IC design by, at least in part, predicting disadvantageous interactions between integration design rules, on a computing device within the computing environment of FIG. 1, in accordance with an embodiment of the present invention.

FIG. 4A is a flowchart depicting operations for optimizing an IC design by, at least in part, predicting disadvantageous interactions between integration design rules, on a computing device within the computing environment of FIG. 1, in accordance with an embodiment of the present invention. More specifically, FIG. 4 is a flowchart depicting operations 400 of IC model verification logic 132 on IC design system 130 within computing environment 100. Similarly, FIG. 4B is a flowchart depicting additional operations that comprise operations 400 of IC model verification logic 132 that can be executed, in addition to the operations depicted in FIG. 4A, to optimize an IC design by, at least in part, predicting disadvantageous interactions between integration design rules, on a computing device within the computing environment of FIG. 1, in accordance with an embodiment of the present invention.

In operation 401, IC model verification logic 132 selects a specific IC feature to analyze with respect to the application of one or more applicable design rules. Accordingly, in operation 402, IC model verification logic 132 selects an integration design rule to analyze with respect to the specific IC feature selected in operation 401. In the embodiment depicted in FIG. 2, for example, IC model verification logic 132 can select IC feature 305 in operation 401 and select integration design rule 330A to analyze with respect to IC feature 305 in operation 402. In this example, integration design rule 330A is analyzed based on the distance between IC feature 305 and IC feature 310 because IC feature 310 is an IC feature to which the selected integration rule applies in addition to IC feature 305. Stated differently, IC feature 310 is "implicated" by the analysis of the selected integration design rule "as a function of" IC feature 305, but IC model verification logic 132 does not analyze the selected integration design rule "as a function of" IC feature 310 in this particular iteration of operations 401 through 416 but may analyze the selected integration design rule for an iteration of operations 401 through 416 in which IC model verification logic 132 selects IC feature 310 in operation 401.

As described with respect to FIGS. 3A and 3B and expression 1, for example, IC model verification logic 132 calculates a "RuleSlack" based on a "RuleValue" for the selected integration design rule and a corresponding "DesignValue" in operation 404. In operation 406, IC model verification logic 132 calculates a "RuleRisk" utilizing (i) expressions 2 and 3 for the selected integration design rule and (ii) a "MaxRisk". As previously discussed, the "RuleRisk" value can be weighted, utilizing expression 7, to reflect the relative importance of various integration design rules and/or IC features. Because the "RuleRisk" value is based on the identity of the specific IC feature in this application of the selected integration design rule, the "RuleRisk" value, and similarly, any "RuleRiskSum" value derived, at least in part, from the "RuleRisk" value, are considered to be values determined "as a function of" the specific IC feature. If IC model verification logic 132 determines that the "RuleRisk" value is equal to zero, because the "RuleSlack" value is equal to or greater than the "MaxRisk" value (decision 408, YES branch), IC model verification logic 132, in operation 410, dumps the "RuleSlack" and "RuleRisk" values calculated with respect to the selected integration design rule and the selected IC feature (i.e., IC model verification logic 132 will not add the "RuleRisk" associated with the selected integration design rule when calculate the "RuleRiskSum" for the selected IC feature). In the embodiment depicted in FIG. 4A, if IC model verification logic 132 determines that the "RuleRisk" value is greater than zero (decision 408, NO branch), IC model verification logic 132 generates a layout (operation 412) that models any IC features to which the selected integration design rule applies. Additionally, the "RuleRisk" value calculated as a function of the selected IC feature for the selected integration design rule will be used in the calculation of the "RuleRiskSum" for the selected IC features. With respect to FIGS. 3A and 3B, for example, the orientation and separation of IC feature 305 and IC feature 310 are modeled with respect to applying integration design rule 330A as a function of IC feature 305.

If IC model verification logic 132 determines that it has not analyzed all integration design rules that are applicable to selected IC features (decision 414, NO branch), IC model verification logic 132 selects another integration design rule to analyze with respect to the selected IC feature (i.e., a subsequent operation 402). In some instances of operations 400, multiple integration design rules are analyzed with respect to one IC feature (e.g., integration design rules 330A, 330B, and 330C with respect to IC feature 305, as discussed with respect to FIGS. 3A and 3B). If IC model verification logic 132 determines that it has analyzed all integration design rules that are applicable to the selected IC feature (decision 414, YES branch), IC model verification logic 132 calculates a "RuleRiskSum" for the selected IC Feature (operation 416). As previously discussed, the "RuleRisk" values used to calculate the "RuleRiskSum" values can be weighted based on the relative importance of integration design rules and/or IC features.

In some embodiments of the present invention, IC model verification logic 132 is executed to analyze a complete IC model. In other embodiments of the present invention, iterations of IC model verification logic 132 are executed to analyze and optimize an IC model based on respective "domains" (i.e., each iteration of IC model verification logic 132 analyzes and optimizes a respective physical region of the IC model). In general, design rule checking is computational intensive, and therefore, it is advantageous to divide an IC model into a plurality of domains and distribute design rule checking tasks (i.e., iterations of IC model verification logic 132) across multiple logical processing units. Each iteration of IC model verification logic 132 executes the applicable logical tasks depicted in FIG. 4A for any integration design rules that are applicable to IC features in a respective domain, or in the case of an analysis and optimization of a complete IC model, each IC feature in the IC model. Accordingly, if IC model verification logic 132 determines that it has analyzed not analyzed all IC features within a respective domain or within the IC model (decision 417, NO branch), IC model verification logic selects another IC feature (i.e., another iteration of operation 401). If IC model verification logic 132 determines that it has analyzed all IC features within a respective domain or within the IC model (decision 417, YES branch), IC model verification logic 132 merges all of the layouts generated in various iterations of operation 412, as described with respect to operation 418 in FIG. 4B. In general, the merged layouts represent applications of integration design rules for which the calculated "RuleRisk" values are greater than zero.

To identify IC features with the highest risks due to multi-rule interactions, IC model verification logic 132 orders (i.e., sorts) IC features based on the calculated "RuleRiskSum" values (operation 420) from high to low. In embodiments like the one depicted in FIG. 4A, IC model verification logic 132 identifies "high-risk" IC features (operation 422) by identifying the IC features having the highest "RuleRiskSum" values up to a threshold count of IC features. Persons having ordinary skill in the art will understand that modeling the "high-risk" IC features, as subsequently described, can be computational intensive, and therefore, that a threshold count can be selected based on available computer processing resources and/or time (e.g., the IC features corresponding to the highest 1,000 "RuleRiskSum" values if ample computer processing resources and/or time are available or merely the IC features corresponding to the highest 10 "RuleRiskSum" values if computer processing resources are limited and/or a deadline is imminent). In some embodiments, IC features having "RuleRiskSum" values equal to zero are dumped in operation 420. In other embodiments, IC features having "RuleRiskSum" values equal to zero are dumped prior to operation 420 (e.g., immediately subsequent to operation 416). In other embodiments, IC model verification logic 132 identifies any IC feature having a "RuleRiskSum" value greater than a threshold "RuleRiskSum" value as a "high-risk" IC feature that may benefit from further design optimization (operation 422). A threshold "RuleRiskSum" value can be selected based on (i) available computer processing resources and/or time and/or (ii) "RuleRiskSum" values that are known or expected to correlate with decrease IC yields and/or reliability.

With respect to each "high-risk" IC feature, IC model verification logic 132 "clips" the IC design around the respective "high-risk" IC features (i.e., models a portion of the IC design; operation 424). In some embodiments of the present invention, the "clipped" area represents an area of the IC design defined by "high-risk" IC features and the "nearest neighbor" features in each direction to the "high-risk" IC features. In other embodiments of the present inventions, the "clipped" area can represent an area of the IC design beyond that defined by the "nearest neighbor" features in each direction; in such embodiments, the "clipped" area can be determined based on integration design rules involving the "high-risk" IC component, predicted failure mechanisms, and other factors that can effect one or more of yield, reliability, and risk. Within the "clipped" area, IC model verification logic 132 simulates an overall failure rate (operation 426). In some embodiments of the present invention, the simulation in operation 426 incorporates all design rules involving IC features within the "clipped" area (e.g., integration rules for which "RuleRisk" equals zero, design rules with respect to IC features for which "RuleRiskSum" equals zero, and/or one or more RDRs and/or process design rules). In other embodiments of the present invention, the simulation in operation 426 incorporates only the integration design rules involving IC features within the merged layouts. Within the "clipped" area, IC model verification logic 132 determines if the overall failure rate is less than a threshold overall failure rate (decision 428). A value for the threshold failure rate can be chosen based on parameters established by the foundry (e.g., a threshold failure rate of 4 σ-5σ). If IC model verification logic 132 determines that the overall failure rate exceeds the threshold overall failure rate within the "clipped" area (decision 428, YES branch), IC model verification logic 132 terminates with respect to processes involving the "clipped" area. In some embodiments, IC verification logic can execute, in sequence or in parallel, iterations of the logical tasks associated with operations 426-436 for a plurality of clipped areas (e.g., to analyze IC designs for which the "nearest-neighbor" approach described herein does not define a contiguous IC area incorporating each "high-risk" IC feature and instead defines a plurality of "clipped" areas).

If IC model verification logic 132 determines that the overall failure rate does not exceed the threshold overall failure rate for the "clipped" area (decision 428, NO branch), IC model verification logic 132 calculates a predicted failure rate for all design rules within the "clipped" area (operation 430 in FIG. 4B). In embodiments where the simulation in operation 426 incorporates all design rules within the "clipped" area (e.g., integration rules for which "RuleRisk" equals zero, design rules with respect to IC features for which "RuleRiskSum" equals zero, and/or one or more RDRs and/or process design rules), data that IC model verification logic 132 can utilize the data obtained via the simulation of the "clipped" area in operation 426 to calculate a predicted failure rate with respect to each rule (operation 430). However, in embodiments where the simulation in operation 426 does not incorporate all design rules within the "clipped" area, IC model verification logic 132 simulates and calculates a predicted failure rate for each design rule within the clipped area (e.g., including integration rules for which "RuleRisk" equals zero, design rules with respect to IC features for which "RuleRiskSum" equals zero, and/or one or more RDRs and/or process design rules). Based on the predicted failure rate for each design rule, IC model verification logic 132 orders the design rules (operation 432) and identifies "high-risk" design rules for which the predicted failure rate exceeds a threshold failure rate for the clipped area. In general, it is advantageous that the threshold failure rate for the clipped area is the same as the threshold overall failure rate or as close to the threshold overall failure rate as possible. In some instances, however, the threshold failure rate within one or more clipped areas can be greater than or less than the threshold overall failure rate based on IC features within the clipped area, the relative importance of a domain in which the "clipped" area is located, design considerations required by the foundry, or various other factors that will be apparent to persons having ordinary skill in the art.

With respect to "high-risk" design rules, IC model verification logic 132 modifies the IC design with respect to IC features associated with the "high-risk" rules in order to increase "RuleSlack," or reduce the predicted failure rate by any other means, for "high-risk" design rules (operation 436). With respect to the example depicted in FIGS. 3A and 3B, increasing "RuleSlack" for "Rule A/B" would involve increasing the separation between IC feature 305 and IC feature 310 (i.e., feature "A" and feature "B") by repositioning one or both or IC feature 305 and IC feature 310 and/or reducing the an appropriate dimension of one or both of IC feature 305 and IC feature 310. In some embodiments, modifications to the IC design are made via one or more automated processes. In other embodiments, modification to the IC design are made manually. In yet other embodiments, modifications to various features of the IC design can be made by one or both of an automated process or a manual process. Because increasing RuleSlack and/or reducing the predicted failure rate of one design rules by other means can affect other design rules, IC model verification logic simulates the overall failure rate in the "clipped area" based on the modified IC design (operation 426, as depicted in FIG. 4A). With respect to modified IC designs, IC model verification logic 132 simulates all design rules within in the "clipped area" regardless of whether or not the initial simulation of the "clipped" area simulated all such design rules. Accordingly, IC model verification logic 132 can advantageously optimize the IC design within the "clipped area" via one or more iterations of operations 426, 430, 432, 434, and 436.

Persons having ordinary skill in the art will readily understand that the optimized IC design can be used to fabricate one or more ICs (e.g., by foundry system 110). As a result of the optimization described herein, yields and reliability may be advantageously increased relative a non-optimized IC design. As described herein, the non-optimized IC design may exhibit lower yields and/or reliability due to complex interactions between integration design rules and/or effects that combine to unacceptably increase the risk of failures and correspondingly decrease yields and reliability when IC features are designed for multiple minimum design rules and/or a minimum integration design rule.

Figure 5:
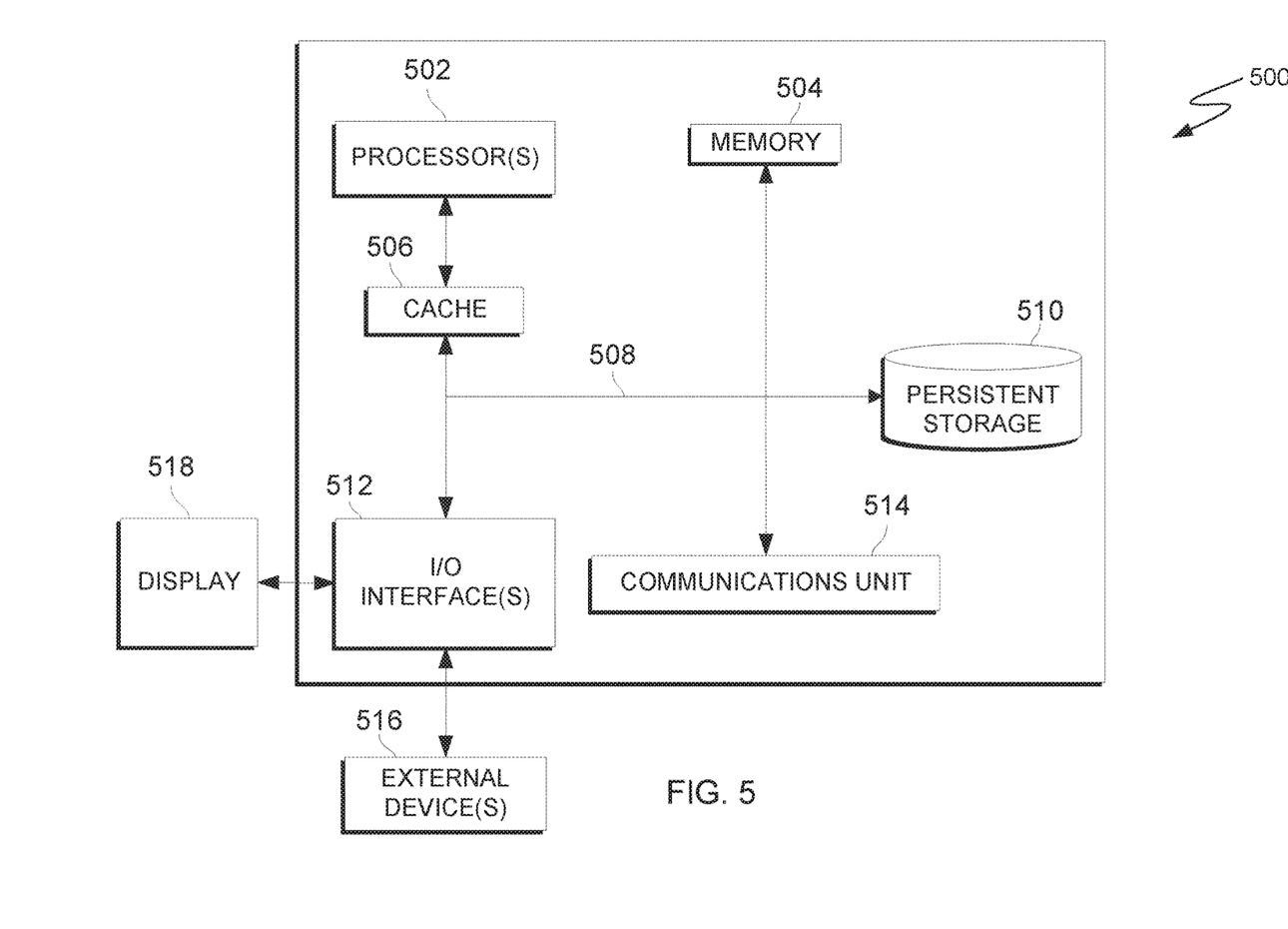
FIG. 5 is a block diagram of components of a computing device, in accordance with an embodiment of the present invention.

FIG. 5 is a block diagram of components of a computing device, generally designated 500, in accordance with an embodiment of the present invention. In one embodiment, computing system 500 is representative of IC design system 130 within computing environment 100, in which case IC design system 130 includes IC model verification logic 132.

It should be appreciated that FIG. 5 provides only an illustration of one implementation and does not imply any limitations with regard to the environments in which different embodiments may be implemented. Many modifications to the depicted environment may be made.

Computing system 500 includes processor(s) 502, cache 506, memory 504, persistent storage 510, input/output (I/O) interface(s) 512, communications unit 514, and communications fabric 508. Communications fabric 508 provides communications between cache 506, memory 504, persistent storage 510, communications unit 514, and input/output (I/O) interface(s) 512. Communications fabric 508 can be implemented with any architecture designed for passing data and/or control information between processors (such as microprocessors, communications and network processors, etc.), system memory, peripheral devices, and any other hardware components within a system. For example, communications fabric 508 can be implemented with one or more buses or a crossbar switch.

Memory 504 and persistent storage 510 are computer readable storage media. In this embodiment, memory 504 includes random access memory (RAM). In general, memory 504 can include any suitable volatile or non-volatile computer readable storage media. Cache 506 is a fast memory that enhances the performance of processor(s) 502 by holding recently accessed data, and data near recently accessed data, from memory 504.

Program instructions and data used to practice embodiments of the present invention may be stored in persistent storage 510 and in memory 504 for execution by one or more of the respective processor(s) 502 via cache 506. In an embodiment, persistent storage 510 includes a magnetic hard disk drive. Alternatively, or in addition to a magnetic hard disk drive, persistent storage 510 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 510 may also be removable. For example, a removable hard drive may be used for persistent storage 510. Other examples include optical and magnetic disks, thumb drives, and smart cards that are inserted into a drive for transfer onto another computer readable storage medium that is also part of persistent storage 510.

Communications unit 514, in these examples, provides for communications with other data processing systems or devices. In these examples, communications unit 514 includes one or more network interface cards. Communications unit 514 may provide communications through the use of either or both physical and wireless communications links. Program instructions and data used to practice embodiments of the present invention may be downloaded to persistent storage 510 through communications unit 514.

I/O interface(s) 512 allows for input and output of data with other devices that may be connected to computer system 500. For example, I/O interface(s) 512 may provide a connection to external device(s) 516 such as a keyboard, keypad, a touch screen, and/or some other suitable input device. External device(s) 516 can also include portable computer readable storage media such as, for example, thumb drives, portable optical or magnetic disks, and memory cards. Software and data used to practice embodiments of the present invention can be stored on such portable computer readable storage media and can be loaded onto persistent storage 510 via I/O interface(s) 512. I/O interface(s) 512 also connect to display 518.

Display 518 provides a mechanism to display or present data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for optimizing integrated circuit (IC) designs based on interactions between multiple integration design rules, the computer program product comprising:
  a computer readable storage medium and program instructions stored on the computer readable storage medium, the program instructions comprising:
    program instructions to identify, within an IC design, a plurality of IC features having design shapes;
    program instructions to, for each IC feature, determine a total risk value based, at least in part, on one or more integration design rules;
    program instructions to order, based on the total risk value of each IC feature, the IC features from an IC feature having a highest total risk value to an IC feature having a lowest total risk value;
    program instructions to identify, beginning with the IC feature having the highest total risk value, a threshold count of IC features from the ordered IC features, wherein IC features within the threshold count of IC features represent a plurality of high-risk IC features;
    program instruction to clip the IC design around the high-risk features to produce a clipped area;
    program instructions to simulate an overall failure rate of IC features within the clipped area;
    program instructions to calculate a predicted failure rate for each design rule that applies to IC features within the clipped area in response to determining that the overall failure rate exceeds a threshold overall failure rate;
    program instructions to identify a high-risk design rule for which the predicted failure rate exceeds a threshold failure rate of the clipped area, wherein the high-risk design rule specifies a respective design rule value; and
    program instructions to modify the IC design such that a difference between the design rule value of the high-risk design rule and a corresponding design value of the IC design is reduced.

2. The computer program product of claim 1, wherein the program instructions to determine the total risk value based on one or more integration design rules comprise, for a respective IC feature:
  program instructions to calculate a first rule risk value based, at least in part, on a first design value of a first dimensional parameter of the IC design and a first integration design rule that specifies a first design rule value for the first dimensional parameter;
  program instructions to calculate a second rule risk value based, at least in part, on a second design value of a second dimensional parameter of the IC design and a second integration design rule that specifies a second design rule value for the second dimensional parameter; and
  program instructions to calculate a total risk value by adding at least the first rule risk value and the second rule risk value.

3. The computer program product of claim 2, the program instructions to determine the total risk value based on one or more integration design rules further comprise, for the respective IC feature:
  program instructions to calculate a first rule slack value of for first design rule by subtracting the first design rule value from the first design value of the first dimensional parameter;
  program instructions to subtract the first rule slack value from a max risk value to calculate the first rule risk value;
  program instruction to calculate a second rule slack value for the second design rule by subtracting the second design rule value from the second design value of the second dimensional parameter; and
  program instructions to subtract the second rule slack value from a max risk value to calculate the second rule risk value.

4. The computer program product of claim 3, wherein the program instructions to determine the total risk value based on one or more integration design rules further comprise, for the respective IC feature:
  program instructions to multiply the first rule risk value by a first weighting coefficient; and
  program instructions to multiply the second rule risk value by a second weighting coefficient.

5. The computer program product of claim 3, wherein the program instructions to determine the total risk value based on one or more integration design rules further comprise, for the respective IC feature:
  program instructions to multiply a difference between the first design rule value and the first design value of the first dimensional parameter by a first weighting coefficient; and
  program instruction to multiply a difference between the second design rule value and the second design value of the second dimensional parameter by a second weighting coefficient.

6. The computer program product of claim 3, wherein:
  the first rule risk value is zero when a result of subtracting the first design rule value from the first design value of the first dimensional parameter is greater than or equal to the max risk value; and
  the second rule risk value is zero when a result of subtracting the second design rule value from the second design value of the second dimensional parameter is greater than or equal to the max risk value.

7. The computer program product of claim 6, wherein the computer program instruction to calculate the predicted failure rate for each design rule that applies to IC features within the clipped area comprise computer program instructions to predict a failure rate for a design rule that applies to an IC feature within the clipped area such that a respective rule risk value equals zero.

8. A computer system for optimizing integrated circuit (IC) designs based on interactions between multiple integration design rules, the computer system comprising:
  one or more computer processors;
  one or more computer readable storage media;
  program instructions stored on the one or more computer readable storage media for execution by at least one of the one or more processors, the program instructions comprising:
    program instructions to identify, within an IC design, a plurality of IC features having design shapes;
    program instructions to, for each IC feature, determine a total risk value based, at least in part, on one or more integration design rules;
    program instructions to order, based on the total risk value of each IC feature, the IC features from an IC feature having a highest total risk value to an IC feature having a lowest total risk value;
    program instructions to identify, beginning with the IC feature having the highest total risk value, a threshold count of IC features from the ordered IC features, wherein IC features within the threshold count of IC features represent a plurality of high-risk IC features;
    program instruction to clip the IC design around the high-risk features to produce a clipped area;
    program instructions to simulate an overall failure rate of IC features within the clipped area;
    program instructions to calculate a predicted failure rate for each design rule that applies to IC features within the clipped area in response to determining that the overall failure rate exceeds a threshold overall failure rate;
    program instructions to identify a high-risk design rule for which the predicted failure rate exceeds a threshold failure rate of the clipped area, wherein the high-risk design rule specifies a respective design rule value; and
    program instructions to modify the IC design such that a difference between the design rule value of the high-risk design rule and a corresponding design value of the IC design is reduced.

9. The computer system of claim 8, wherein the program instructions to determine the total risk value based on one or more integration design rules comprise, for a respective IC feature:
  program instructions to calculate a first rule risk value based, at least in part, on a first design value of a first dimensional parameter of the IC design and a first integration design rule that specifies a first design rule value for the first dimensional parameter;
  program instructions to calculate a second rule risk value based, at least in part, on a second design value of a second dimensional parameter of the IC design and a second integration design rule that specifies a second design rule value for the second dimensional parameter; and
  program instructions to calculate a total risk value by adding at least the first rule risk value and the second rule risk value.

10. The computer system of claim 9, the program instructions to determine the total risk value based on one or more integration design rules further comprise, for the respective IC feature:
  program instructions to calculate a first rule slack value of for first design rule by subtracting the first design rule value from the first design value of the first dimensional parameter;
  program instructions to subtract the first rule slack value from a max risk value to calculate the first rule risk value;
  program instruction to calculate a second rule slack value for the second design rule by subtracting the second design rule value from the second design value of the second dimensional parameter; and
  program instructions to subtract the second rule slack value from a max risk value to calculate the second rule risk value.

11. The computer system of claim 10, the program instructions to determine the total risk value based on one or more integration design rules further comprise, for the respective IC feature:
  program instructions to calculate a first rule slack value of for first design rule by subtracting the first design rule value from the first design value of the first dimensional parameter;
  program instructions to subtract the first rule slack value from a max risk value to calculate the first rule risk value;
  program instruction to calculate a second rule slack value for the second design rule by subtracting the second design rule value from the second design value of the second dimensional parameter; and
  program instructions to subtract the second rule slack value from a max risk value to calculate the second rule risk value.

12. The computer system of claim 11, wherein the program instructions to determine the total risk value based on one or more integration design rules further comprise, for the respective IC feature:
   program instructions to multiply the first rule risk value by a first weighting coefficient; and
   program instructions to multiply the second rule risk value by a second weighting coefficient.

13. The computer system of claim 11, wherein the program instructions to determine the total risk value based on one or more integration design rules further comprise, for the respective IC feature:
   program instructions to multiply a difference between the first design rule value and the first design value of the first dimensional parameter by a first weighting coefficient; and
   program instruction to multiply a difference between the second design rule value and the second design value of the second dimensional parameter by a second weighting coefficient.

* * * * *